United States Patent [19]

Yano et al.

[11] 4,264,150
[45] Apr. 28, 1981

[54] ELECTROCHROMIC DISPLAY WITH LYOPHILIC TREATMENT SEPARATOR

[75] Inventors: Kohzo Yano; Hiroaki Kato; Yasuhiko Inami, all of Tenri; Hisashi Uede, Yamatokoriyama, all of Japan

[73] Assignee: Sharp Kabushiki Kaisha, Osaka, Japan

[21] Appl. No.: 4,144

[22] Filed: Jan. 17, 1979

[30] Foreign Application Priority Data

Jan. 23, 1978 [JP] Japan .................................. 53-6598

[51] Int. Cl.³ ............................................. G02F 1/17
[52] U.S. Cl. .................................................. 350/357
[58] Field of Search .......................... 350/357; 29/570

[56] References Cited

U.S. PATENT DOCUMENTS 4,021,100  5/1977  Giglia ..................................... 350/357
4,116,546  9/1978  Leibowitz ............................. 350/357

FOREIGN PATENT DOCUMENTS 2802728  7/1978  Fed. Rep. of Germany ........... 350/357

Primary Examiner—James W. Davie
Attorney, Agent, or Firm—Birch, Stewart, Kolasch and Birch

[57] ABSTRACT

A porous separator used for an electrochromic display cell is treated by lyophilic methods so as to be impregnated by an electrolyte. The lyophilic treatment makes it possible to assure that the electrolyte is well impregnated into the porous separator. An angle of contact between the porous film and the electrolyte is selected within an amount less than 20 degrees. A cavity is introduced into the electrochromic display cell, which does not contain the electrolyte therein for the absorption of the cubic expansion of the electrolyte.

32 Claims, 3 Drawing Figures

ELECTROCHROMIC DISPLAY WITH LYOPHILIC TREATMENT SEPARATOR

BACKGROUND OF THE INVENTION

The present invention relates generally to electro-optical displays of the type in which electrochromic material undergoes reversible color changes upon the application of an electric field. More particularly, the present invention relates to an improved sandwich construction of an electrochromic display.

In commonly assigned, copending U.S. Pat. Application Ser. No. 054,918 filed July 5, 1979 which is a continuation of Ser. No. 871,618 filed Jan. 23, 1978, now abandoned, there are described an electrochromic display including a porous separator and/or a filter separator each of which can contain an electrolyte. A cavity is defined to cancel the cubic expansion of the electrolyte with rising temperature. The filter separator functions to confine the cavity in the remaining portion except for the display area. However, since the filter separator or glass fibre of the like can not provide the function of reflecting light, light reflection efficiency is inevitably reduced so that it prevents the porous separator from functioning as a background for the layer of the electrochromic material.

OBJECTS AND SUMMARY OF THE INVENTION

With the foregoing in mind, it is a principal object of the invention to provide an improved electrochromic display cell where highly stable operations are ensured.

It is a further object of the invention to provide an improved electrochromic display cell which enhances reliability and visibility.

It is a further object of the invention to provide an improved electrochromic display cell of the type using an liquid electrolyte which bears a higher resistance against temperature changes and provides well-defined visual indications by providing a clear background in contrast to images.

Other objects and further scope of applicability of the present invention will become apparant from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a separator treated by lyophilic methods is positioned between an electrochromic layer and a counter electrode which has a colorness different from the coloration of the electrochromic layer upon the application of an electric field by forming a pigment layer on a porous film. The pigment layer is confined on the surface of the porous film by coating a synthetic resin on the pigment layer. The porous film is subject to lyophilic treatment in order to be inpregnated with an amount of an electrolyte.

The lyophilic treatment is carried out, for example, by coating with surface-active agents the surface of the porous film through dipping or painting and, thereafter, the porous film is reacted with the surface-active agents by being baked or exposed to radioactive rays. Hence, an angle of contact between the porous film and a polar solvent as an electrolyte in an electrochromic display cell is selected within a range less than 20 degrees. The polar solvent has a high dielectric constant.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
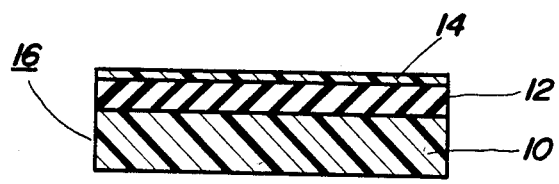
FIG. 1 is a cross-sectional view of a separator member according to the present invention.

FIG. 1 shows a separator 16 of the present invention where there are included a porous film 10, a pigmented film 12, and a layer 14 of synthetic resin. The porous film 10 is a filter made of a fluorocarbon polymer, such as Teflon, polypropylene, polyethylene or the like having a relatively low polarity with a thickness of 100–500 $\mu$m. The porosity of the porous film 10 is preferably 50–80%. The pigmented film 12 is formed by coating or spraying a proper pigment material on the porous film 10. The pigment material used comprises particles of titanium oxide or barium sulfate which are resolved into a suitable solvent with an amount of 10–30 weight % and dispersed uniformly. The pigmented film 12 has a thickness of 10–30$\mu$m, preferably.

The synthetic resin for the layer 14 is selected from either copolymer between tetrafuluoroethylene and ethylene or fluoride rubber coating. Such materials are formed on the pigmented film 12 by spraying or painting techniques. The layer 14 has a thickness of 10–20 $\mu$m. Otherwise, a pigment may be dispersed within the synthetic resin and the results can be directly coated on the porous film 10. The pigment can be added into the synthetic resin to the extent of about 50 vol% for coating purposes.

The separator 16 is subjected to the lyophilic treatment so as to contain an electrolyte of an electrochromic display device. The lyophilic treatment is carried out, for example, by coating surface-active agents of fluoride on the surfaces of the separator 16 through dipping or painting methods. Thereafter, the separator 16 is baked or exposed to radioactive rays to be reacted with the surface-active agents. The lyophilic treatment is similar to the hydrophilic treatments in the field of manufacturing filter papers.

A polar solvent is preferable informing an electrolyte used in an electrochromic dislay device. The polar solvent has a high dielectric constant. An angle of contact between the separator 16 and the polar solvent is selected within a range less than 20 degrees according to the lyophilic treatment. The angle of contact is the angle between the surface of the polar solvent and the surface of the partially submerged separator.

The separator 16 is thus treated so that the electrolyte can be readily impregnated into the separator 16 which has a colorness enough to provide the background for an electrochromic layer. Affinity is then assured between the separator 16 and the electrolyte. The separator 16 has a sufficient electric conductivity under the conditions that it contains the electrolyte. A cavity is confined within the electrochromic display cell to absorb the cubic expansion of the electrolyte with rising temperature. Since the separator 16 treated by lyophilic methods tends to absorb the electrolyte, rather than the cavity, the cavity contained in the electrochromic display cell is prevented from approaching the separator 16, whereby the cavity remains defined in a restricted zone not to impair visibility of the display area.

Specific examples of the present invention are described below.

EXAMPLE 1

Figure 2:
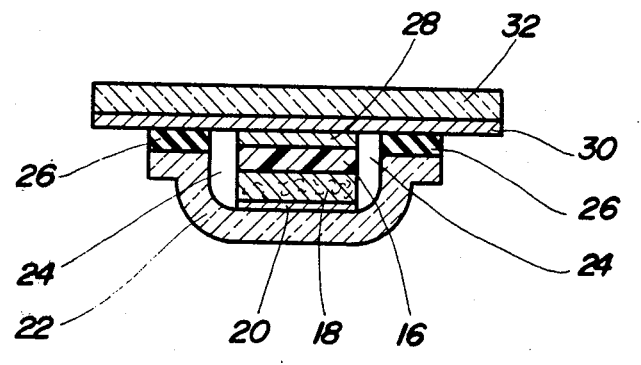
FIG. 2 is a cross-sectional view of an electrochromic display device adapted by the separator member of FIG. 1.

With reference to FIG. 2, the above-mentioned separator 16 was composed in the electrochromic display device wherein there were provided a flat glass substrate 32, a coductive, transparent electrode 30 such as indium oxide ($InO_2$) thereon, an electrochromatic layer 28 which comprised a preferred electrochromic material such as tungsten oxide ($WO_3$).

The flat glass substrate 32 may comprise, for example, a glass plate of 1 mm thickness manufactured by MATSUNAMI GLASS INDUSTRY LIMITED. The electrochromic layer 28 was deposited by vacuum deposition, although other processes such as sputtering, electrochemical deposition, spray or silk screening are actually available. A display electrode consisting of the flat glass substrate 32, the conductive, transparent electrode 30, and the electrochromic layer 28 was patterned for indicating any desired images, for example, characters and symbols.

A counter electrode 20 was formed on a dish shaped glass substrate 22 for carrying out electrochromic phenomena with a relationship with the electrochromic layer 28. A seal member 26 adhers the flat glass substrate 32 and the dish shaped glass substrate 22 to each other to thereby define a compartment of the electrochromic display device.

The seal member 26 was seal agents SE-1700 produced by TORAY SILICONE Co. which was coated by screen painting methods. The dish shaped glass substrate 22 had a recession of a depth of 1 mm. The glass produced by TOA DENPA Co. was available for the dish shaped glass substrate 22. The counter electrode 20 comprised two films each made of nickel and tungsten oxide manufactured by, for example, vacuum evaporation techniques.

The above-mentioned separator 16 was arranged between the electrochromic layer 28 and the counter electrode 20. The separator 16 was treated by the lyophilic method. The separator 16 had a thickness of about 250 $\mu$m. A porous whilte Teflon filter KS-2004 commercially available from SUMITOMO ELECTRIC INDUSTRIES, LTD. was utilized for the separator 16. The separator 16 served as a water-attracting member and a background for the electrochromic layer 28.

Another filter 18 such as a glass fibre filter GA-100 fabricated by TOYO KAGAKU INDUSTRIES LTD. was further arranged between the separator 16 and the counter electrode 20. The filter 18 was elastic enough to stress the separator 16 toward the electrochromic layer 28 and itself toward the counter electrode 20. In accordance with the separator 16 and the filter 18, the electrochromic layer 28 became electrically related to the counter electrode 20 through the electrolyte impregnated within the separator 16 and the filter 18. The filter 18 may comprise asbestos, Polyfrone paper (commercial name), non woven fabric or olefin in the form of a mat such as polypropylene, or a porous gun plate, etc.

The resulting electrochromic display device was heated for an hour at 120° C. under a pressure of 10 Kg/cm$^2$ to cure the seal member 26. Thereafter, the electrolyte was introduced into the compartment of the electrochromic display device through an injection hole (not shown), the electrolyte as the polar solvent comprising 0.1 mol/l molar solutions of lithium perchlorate (LiClO$_4$) in $\gamma$-Butyrolactone. The electrochromic display device was then positioned within an environment having a lowered pressure of about 0.1 torr to form a cavity 24 by excluding the remaining electrolyte which does not permeate the separator 16 and the filter 18. Nitrogen gas, or other inert gas, atmosphere or the like was introduced into the cavity 24. The injection hole was sealed by seal materials, for example, silicon resin KE-RTV (by SHIN'ETSU CHEMICAL Co.).

Figure 3:
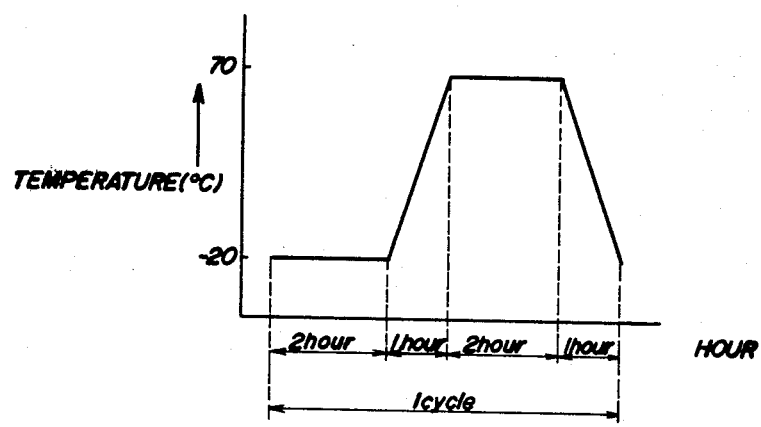
FIG. 3 is a temperature diagram applied to the electrochromic display device of FIG. 2.

The composed electrochromic display device was examined by exposure to the temperature process shown in FIG. 3. The abscissa of the chart of FIG. 3 shows an hour dimension and the ordinate a temperature dimension. A relative humidity was selected at room temperature.

The electrochromic display device was checked after 40 cycles of the temperature change shown in FIG. 3 were applied while disposed within a thermo-hygrostat. The electrochromic display device was found to maintain the satisfactory display characteristics upon review of the above examination. The electrochromic phenomena remained enhanced because the separator 16 kept absorbing the electrolyte and the filter 18 was elastic enough to stress the separator 16 toward the electrochromic layer 28 and advance itself to the counter electrode 20. The electrochromic layer 28 was completely electrically related to the counter electrode 20 by means of the electrolyte.

The characteristics of the white background of the separator 16 were that a reflection of 60% was observed with respect to a white lamp of magnesium oxide with a wavelength of 590 nm. The response operations with the wavelength of 590 nm were that a visual contrast ratio of 10:1 is accomplished during 0.2 seconds for writing purposes and 0.3 seconds for erasing purposes in connection with an applied voltage of 1.0 volt. This electrochromic display device is excellently practicable for commercial purposes.

EXAMPLE 2

The above-mentioned procedures were repeated with the exception that the following separator 16 was used in place of the aforementioned porous white Teflon filter. This white and porous separator 16 comprised a porous film 10 made of polypropylene and a coating 14 of fluoride rubber containing a pigment material.

The porous film 10 of a thickness of 100 $\mu$m was commercially available by PPLY PLASTIC CO. under the name of "Juragard". The coating 14 of the fluoride rubber was a coating under the name of "Perfuron" manufactured by KON'YO Co. Such coating 14 was formed on the porous film 10 with a thickness of 20 $\mu$m. The separator 16 was heated at 150° C. for two hours. The surface-active agents of the trade name of "Fulorard" FC 176 producted by SUMITOMO 3M Co. Ltd. were coated by dipping and heated for 30 minutes at 150° C. The electrochromic display device having this white and porous separator 16 exhibited good reliability and response characteristics similar to Example 1.

It will be apparently noted that another kind of the ECD can employ the present invention, wherein the ECD is so arranged to form an insoluble colored film on a cathode by reducing a colorless liquid through electrochemical reactions, although the above description is all directed to the ECD which employs inorganic solid film such as tungsten oxide ($WO_3$).

While only certain embodiments of the present invention have been described, it will be apparent to those skilled in the art that various changes and modifications may be made therein without departing from the spirit and scope of the invention as claimed.

What is claimed is:

1. An electrochromic display cell comprising:
   first and second substrates;
   at least one display electrode arranged on the first substrate;
   a counter electrode arranged on the second substrate;
   a layer of an electrochromic material formed on the display electrode;
   a porous separator coated with a surface-active agent, said separator disposed between the layer of the electrochromic material and the counter electrode, said porous separator being impregnated with an electrolyte; and
   a cavity provided within a compartment defined by said first and second substrates, said cavity absorbing the expansion of said electrolyte.

2. The electrochromic display cell according to claim 1, wherein the angle of contact between said porous separator and said electrolyte is reduced by said surface-active agent to an angle of less than 20 degrees.

3. The electrochromic display cell according to claim 1, wherein a layer of a pigment material is further formed on said porous separator and the color of said pigment material contrasts from color produced by said electrochromic layer upon coloration, said pigment layer providing a background for said electrochromic layer.

4. The electrochromic display cell according to claim 3, wherein said layer of said pigment material is attached to said porous separator using a layer of synthetic resin.

5. The electrochromic display cell according to claim 3, wherein said layer of said pigment material is formed on said porous separator by dispersing said pigment material within a layer of synthetic resin to form a pigment-resin layer.

6. The electrochromic display cell according to claim 5, wherein said pigment-resin layer is approximately 50% or less pigment by volume.

7. The electrochromic display cell according to claim 1, wherein there is further provided an elastic filter between said porous separator and said counter electrode for stressing said porous separator toward said electrochromic layer and stressing itself against said counter electrode, said elastic filter being impregnated by said electrolyte.

8. The electrochromic display cell according to claim 1, wherein the remaining electrolyte not impregnated within said porous separator is removed from the compartment defined by said first and second substrates.

9. The electrochromic display cell according to claim 7, wherein the remaining electrolyte not impregnated within said porous separator and said elastic filter is removed from the compartment defined by said first and second substrates.

10. The electrochromic display cell according to claim 1, wherein a lyophilic treatment is carried out by coating said surface-active agents on the surface of said porous separator through dipping, or painting and said porous separator is reacted with the surface-active agents by being baked or exposed to radiation rays.

11. The electrochromic display cell according to claim 1, wherein said porous separator comprises a film as thin as 100–500 $\mu$m.

12. The electrochromic display cell according to claim 1, wherein said porous separator comprioses a film approximately 100–500 $\mu$m thick.

13. The electrochromic display cell according to claim 1, wherein said porous separator is made of a fluorocarbon polymer, polypropylene or polyethylene.

14. The electrochromic display cell according to claim 3, wherein said pigment material comprises titanium oxide or barium sulfate.

15. The electrochromic display cell according to claim 3, wherein said layer of the pigment material is 10–30 $\mu$m in thickness.

16. The electrochromic display cell according to claim 4 or 5, wherein said layer of the synthetic resin is 10–20 $\mu$m in thickness.

17. The electrochromic display cell according to claim 4 or 5, wherein said synthetic resin comprises a copolymer of tetrafluoroethylene and ethylene or fluoride rubber.

18. The electrochromic display cell according to claim 1, wherein said electrolyte is a polar solution.

19. An electrochromic display cell comprising:
   a display electrode and a counter electrode;
   a layer of electrochromic material disposed between the display and counter electrode;
   a porous separator coated with a surface active agent, said separator disposed between said electrochromic layer and said counter electrode, said porous separator being impregnated with an electrolyte.

20. The electrochromic display cell according to claim 19, wherein there is further included a cavity, said cavity absorbing the cubic expansion of said electrolyte.

21. The electrochromic display cell according to claim 19, wherein the angle of contact between said porous separator and said electrolyte is reduced by said surface-active agent to an angle of less than 20 degrees.

22. An electrochromic display cell comprising:
   a display electrode and a counter electrode;
   a layer of an electrochromic material disposed between the display and counter electrodes;
   a porous separator coated with a suface-active agent, said separator positioned between said electrochromic layer and said counter electrode; and
   said porous separator having lyophilic characteristics which allow the impregnation of said porous separator with an electrolyte.

23. The electrochromic display cell according to claim 22, wherein the lyophilic characteristics of said porous separator produce an angle of contact between said porous separator and said electrolyte of less than 20 degrees.

24. The electrochromic display cell of claim 1 or 19 wherein the angle of contact between said electrolyte and said porous separator is reduced by said surface-active agent applied to said porous separator.

25. The electrochromic display cell of claim 24 wherein said surface-active agent is a fluoride.

26. The electrochromic display cell of claim 19 or 22 wherein said porous separator is an organic polymer.

27. The electrochromic display cell of claim 26 wherein said porous separator is a fluorocarbon polymer.

28. The electrochromic display cell of claim 26 wherein said organic polymer has a relatively low polarity.

29. The electrochromic display all of claim 26 wherein said porous separator is made of polypropylene or polyethylene.

30. The electrochromic display cell of claim 26 wherein said electrolyte is a polar solvent.

31. The electrochromic display cell of claim 26 wherein said electrolyte is a 0.1 mol/l molar solution of lithium perchlorate in γ-butyrolactone.

32. The electrochromic display cell of claim 26 wherein said electrolyte is a solution of lithium perchlorate in γ-butyrolactone.

* * * * *